T. E. MURRAY, Jr., AND J. B. MURRAY.
ELECTRICALLY WELDED TUBE AND METHOD OF MAKING THE SAME.
APPLICATION FILED JULY 3, 1920.
1,363,158. Patented Dec. 21, 1920.
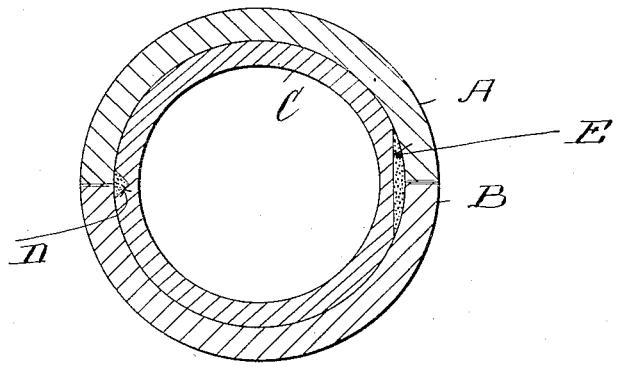
Inventors
Thomas E. Murray Jr
Joseph B. Murray
By their Attorney
Mark Benjamin

UNITED STATES PATENT OFFICE.

THOMAS E. MURRAY, JR., AND JOSEPH B. MURRAY, OF BROOKLYN, NEW YORK.

ELECTRICALLY-WELDED TUBE AND METHOD OF MAKING THE SAME.

1,363,158. Specification of Letters Patent. Patented Dec. 21, 1920.

Application filed July 3, 1920. Serial No. 393,860.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Electrically-Welded Tubes and Methods of Making the Same, of which the following is a specification.

The invention is a tube formed of an inner tube and an outer tube electrically united, and a method of making the same.

The outer tube is here made in two longitudinal half sections having their edges in contact registry and electrically welded together. A portion of the outer periphery of the wall of the inner tube is removed opposite to the welded joints, and chambers are thus formed between said inner tube and said outer tube in which the metal extruded from the joints during the welding operation is received. In this way the tubes are united.

The accompanying drawing is a transverse section of the two tubes disposed one within the other and united, as hereinafter described, by electrical welding.

The outer tube is formed in two longitudinal half sections A, B placed with their edges in registering contact and electrically welded. In the wall of the inner tube C are formed, by cutting or otherwise, oppositely placed grooves, one of which is shown at D. Said grooves do not extend through said wall. In placing the tubes together, the inner tube C having the grooves D is placed within one section, as B, of the outer tube, so that the edges of said section extend partly over the grooves D. The other section A is then placed with its edges in registering contact with the edges of section B, and said sections are then electrically welded together. During the welding operation the extruded metal at the joints flows into the chambers provided by the grooves D, and on hardening therein locks the two tubes together.

Instead of producing the chambers for the extruded metal by forming in the outer periphery of the inner wall grooves such as D, we may form said chambers by cutting or grinding off a portion of said periphery, as shown at E, the extruded metal then entering the space between the outer face of said cut or ground off portion and the outer tube.

We claim:

1. The method of uniting a metal outer tube to a metal inner tube, which consists in removing a portion of the outer periphery of the wall of the inner tube to form a recess, placing said inner tube within said outer tube, and then fusing a portion of the metal of the outer tube to cause it to flow into said recess.

2. The combination of a metal outer tube formed in two longitudinal half sections electrically welded at their edges, and an inner tube having a portion of its wall opposite a welded joint of said outer tube removed to form a chamber between said tubes and receiving metal extruded from said welded joints.

3. The combination of a metal outer tube formed in two longitudinal half sections electrically welded at their edges, and an inner tube having a groove on its outer periphery formed by removing a portion of the metal of said wall; the said groove being placed opposite a welded joint of said outer tube and receiving metal extruded from said joint.

In testimony whereof we have affixed our signatures in presence of two witnesses.

THOMAS E. MURRAY, JR.
JOSEPH B. MURRAY.

Witnesses:
GERTRUDE T. PORTER,
MAY T. McGARRY.